(12) United States Patent
Zhou et al.

(10) Patent No.: US 11,477,775 B2
(45) Date of Patent: Oct. 18, 2022

(54) METHODS AND APPARATUS FOR ACK FOR SPS REACTIVATION DCI

(71) Applicant: QUALCOMM Incorporated, San Diego, CA (US)

(72) Inventors: Yan Zhou, San Diego, CA (US); Mostafa Khoshnevisan, San Diego, CA (US); Seyed Ali Akbar Fakoorian, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/905,631

(22) Filed: Jun. 18, 2020

(65) Prior Publication Data

US 2020/0404633 A1 Dec. 24, 2020

Related U.S. Application Data

(60) Provisional application No. 62/865,054, filed on Jun. 21, 2019.

(51) Int. Cl.
*H04W 4/00* (2018.01)
*H04W 72/04* (2009.01)

(52) U.S. Cl.
CPC ..... *H04W 72/042* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 2018/0206132 A1* | 7/2018 | Guo | H04W 72/0473 |
| 2018/0288746 A1 | 10/2018 | Zhang et al. | |
| 2019/0014564 A1* | 1/2019 | Lee | H04L 5/0042 |
| 2019/0044811 A1* | 2/2019 | Miao | H04L 41/0896 |
| 2021/0243763 A1* | 8/2021 | Zhou | H04L 1/1819 |

OTHER PUBLICATIONS

International Search Report and Written Opinion—PCT/US2020/038690—ISA/EPO—dated Nov. 3, 2020.

(Continued)

*Primary Examiner* — Clemence S Han

(74) *Attorney, Agent, or Firm* — Qualcomm Incorporated

(57) ABSTRACT

Aspects of the present disclosure include methods, apparatuses, and computer readable media for receiving a reactivation downlink control information (DCI) associated with a new periodic resource configuration and an updated uplink feedback parameter for a scheduled uplink control information transmission, receiving downlink control information, changing a transmission parameter of the scheduled uplink control information transmission based on the updated uplink feedback parameter, and transmitting the scheduled uplink control information transmission based on the changed transmission parameter to indicate uplink feedback regarding reception of the reactivation DCI.

47 Claims, 13 Drawing Sheets

(56) References Cited

OTHER PUBLICATIONS

Intel Corporation: "On Inter-UE UL Multiplexing for eURLLC", 3GPP Draft, 3GPP TSG RAN WG1 Meeting #96, R1-1902497 Intel—UL Inter-UE MUX, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600193, 12 pages.
Partial International Search Report—PCT/US2020/038690—ISAEPO—dated Sep. 10, 2020.
QUALCOMM Incorporated: "Enhanced Grant-Free Transmissions for eURLLC", 3GPP Draft, 3GPP TSG-RAN WG1 Meeting #96, R1-1903009 Enhanced Grant-Free Transmissions for eURLLC, 3rd Generation Partnership Project (3GPP), Mobile Competence Centre, 650, Route Des Lucioles, F-06921 Sophia-Antipolis Cedex, FR, vol. RAN WG1, No. Athens, Greece, Feb. 25, 2019-Mar. 1, 2019, Feb. 16, 2019 (Feb. 16, 2019), XP051600706, 7 Pages.

\* cited by examiner

METHODS AND APPARATUS FOR ACK FOR SPS REACTIVATION DCI

CROSS-REFERENCE TO RELATED APPLICATIONS

The current application claims priority to and the benefit of U.S. Provisional Application No. 62/865,054, filed on Jun. 21, 2019, entitled "Methods and Apparatus for ACK for SPS Reactivation DCI," the content of which are incorporated by reference in its entirety.

BACKGROUND

Aspects of the present disclosure relate generally to wireless communications, and more particularly, to apparatus and methods for transmitting and/or receiving acknowledgement (ACK) or negative acknowledgment (NACK) for semi-persistent scheduling (SPS) reactivation downlink control information (DCI).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a communications network, a semi-persistent scheduling (SPS) may provide for the scheduling of a periodic communication (e.g., transmitting an uplink communication and/or receiving a downlink communication) for a UE. For instance, a base station (BS) may transmit configuration information identifying an SPS configuration and/or a configuration grant (CG), and the user equipment (UE) may respond with an ACK or NACK to indicate success or failure in receiving the configuration information. The ACK or NACK may include one or more bits. Further, the BS may transmit a reactivation downlink control information (DCI) to change the SPS and/or CG, but the base station may not know whether the UE has received the reactivation DCI. Therefore, improvements in SPS reactivation communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving a reactivation downlink control information (DCI) associated with a new periodic resource configuration and an updated uplink feedback parameter for a scheduled uplink control information transmission, receiving downlink control information, changing a transmission parameter of the scheduled uplink control information transmission based on the updated uplink feedback parameter, and transmitting the scheduled uplink control information transmission based on the changed transmission parameter to indicate uplink feedback regarding reception of the reactivation DCI.

Other aspects of the present disclosure include a UE having a memory, a transceiver, and one or more processors operatively coupled with the memory and the transceiver, the one or more processors configured to perform the steps of receiving a reactivation downlink control information (DCI) associated with a new periodic resource configuration and an updated uplink feedback parameter for a scheduled uplink control information transmission, receiving downlink control information, changing a transmission parameter of the scheduled uplink control information transmission based on the updated uplink feedback parameter, and transmitting the scheduled uplink control information transmission based on the changed transmission parameter to indicate uplink feedback regarding reception of the reactivation DCI.

An aspect of the present disclosure includes a UE including means for receiving a reactivation downlink control information (DCI) associated with a new periodic resource configuration and an updated uplink feedback parameter for a scheduled uplink control information transmission, means for receiving downlink control information, means for changing a transmission parameter of the scheduled uplink control information transmission based on the updated uplink feedback parameter, and means for transmitting the scheduled uplink control information transmission based on the changed transmission parameter to indicate uplink feedback regarding reception of the reactivation DCI.

Some aspects of the present disclosure include non-transitory computer readable media having instructions stored therein that, when executed by one or more processors of a UE, cause the one or more processors to perform the steps of receiving a reactivation downlink control information (DCI) associated with a new periodic resource configuration and an updated uplink feedback parameter for a scheduled uplink control information transmission, receiving downlink control information, changing a transmission parameter of the scheduled uplink control information transmission based on the updated uplink feedback parameter, and transmitting the scheduled uplink control information transmission based on the changed transmission parameter to indicate uplink feedback regarding reception of the reactivation DCI.

Aspects of the present disclosure include methods for receiving a reactivation downlink control information (DCI) associated with a new periodic resource configuration and a DCI-specific uplink feedback resource and transmitting, in response to reception of the reactivation DCI and using the DCI-specific uplink feedback resource, dedicated uplink control information transmission to indicate uplink feedback regarding reception of the reactivation DCI.

Other aspects of the present disclosure include a UE having a memory, a transceiver, and one or more processors operatively coupled with the memory and the transceiver, the one or more processors configured to perform the steps of receiving a reactivation downlink control information (DCI) associated with a new periodic resource configuration and a DCI-specific uplink feedback resource and transmitting, in response to reception of the reactivation DCI and using the DCI-specific uplink feedback resource, dedicated uplink control information transmission to indicate uplink feedback regarding reception of the reactivation DCI.

An aspect of the present disclosure includes a UE including means for receiving a reactivation downlink control information (DCI) associated with a new periodic resource configuration and a DCI-specific uplink feedback resource and means for transmitting, in response to reception of the reactivation DCI and using the DCI-specific uplink feedback resource, dedicated uplink control information transmission to indicate uplink feedback regarding reception of the reactivation DCI Some aspects of the present disclosure include non-transitory computer readable media having instructions stored therein that, when executed by one or more processors of a UE, cause the one or more processors to perform the steps of receiving a reactivation downlink control information (DCI) associated with a new periodic resource configuration and a DCI-specific uplink feedback resource and transmitting, in response to reception of the reactivation DCI and using the DCI-specific uplink feedback resource, dedicated uplink control information transmission to indicate uplink feedback regarding reception of the reactivation DCI.

Aspects of the present disclosure include methods for receiving a reactivation downlink control information (DCI) including a new periodic resource configuration, receiving downlink control information, including DCI feedback information in a scheduled uplink control information transmission, and transmitting the scheduled uplink control information transmission including the DCI feedback information to indicate feedback regarding reception of the reactivation DCI.

Other aspects of the present disclosure include a UE having a memory, a transceiver, and one or more processors operatively coupled with the memory and the transceiver, the one or more processors configured to perform the steps of receiving a reactivation downlink control information (DCI) including a new periodic resource configuration, receiving downlink control information, including DCI feedback information in a scheduled uplink control information transmission, and transmitting the scheduled uplink control information transmission including the DCI feedback information to indicate feedback regarding reception of the reactivation DCI.

An aspect of the present disclosure includes a UE including means for receiving a reactivation downlink control information (DCI), means for receiving a reactivation downlink control information (DCI) including a new periodic resource configuration, means for receiving downlink control information, means for including DCI feedback information in a scheduled uplink control information transmission, and means for transmitting the scheduled uplink control information transmission including the DCI feedback information to indicate feedback regarding reception of the reactivation DCI.

Some aspects of the present disclosure include non-transitory computer readable media having instructions stored therein that, when executed by one or more processors of a UE, cause the one or more processors to perform the steps of receiving a reactivation downlink control information (DCI) including a new periodic resource configuration, receiving downlink control information, including DCI feedback information in a scheduled uplink control information transmission, and transmitting the scheduled uplink control information transmission including the DCI feedback information to indicate feedback regarding reception of the reactivation DCI.

Aspects of the present disclosure include methods for transmitting a reactivation downlink control information (DCI) associated with a new periodic resource configuration and an updated uplink feedback parameter for a scheduled uplink control information transmission, transmitting downlink control information, and receiving the scheduled uplink control information transmission based on the updated uplink feedback parameter indicating uplink feedback regarding reception of the reactivation DCI.

Other aspects of the present disclosure include a BS having a memory, a transceiver, and one or more processors operatively coupled with the memory and the transceiver, the one or more processors configured to perform the steps of transmitting a reactivation downlink control information (DCI) associated with a new periodic resource configuration and an updated uplink feedback parameter for a scheduled uplink control information transmission, transmitting downlink control information, and receiving the scheduled uplink control information transmission based on the updated uplink feedback parameter indicating uplink feedback regarding reception of the reactivation DCI.

An aspect of the present disclosure includes a BS including means for transmitting a reactivation downlink control information (DCI) associated with a new periodic resource configuration and an updated uplink feedback parameter for a scheduled uplink control information transmission, means for transmitting downlink control information, and means for receiving the scheduled uplink control information transmission based on the updated uplink feedback parameter indicating uplink feedback regarding reception of the reactivation DCI.

Some aspects of the present disclosure include non-transitory computer readable media having instructions stored therein that, when executed by one or more processors of a BS, cause the one or more processors to perform the steps of transmitting a reactivation downlink control information (DCI) associated with a new periodic resource configuration and an updated uplink feedback parameter for a scheduled uplink control information transmission, transmitting downlink control information, and receiving the scheduled uplink control information transmission based on the updated uplink feedback parameter indicating uplink feedback regarding reception of the reactivation DCI.

Aspects of the present disclosure include methods for transmitting a reactivation downlink control information (DCI) associated with a new periodic resource configuration and a DCI-specific uplink feedback resource, and receiving a dedicated uplink control information transmission indicating uplink feedback regarding reception of the reactivation DCI.

Other aspects of the present disclosure include a BS having a memory, a transceiver, and one or more processors operatively coupled with the memory and the transceiver, the one or more processors configured to perform the steps of transmitting a reactivation downlink control information (DCI) associated with a new periodic resource configuration and a DCI-specific uplink feedback resource, and receiving a dedicated uplink control information transmission indicating uplink feedback regarding reception of the reactivation DCI.

An aspect of the present disclosure includes a BS including means for transmitting a reactivation downlink control information (DCI) associated with a new periodic resource configuration and a DCI-specific uplink feedback resource, and means for receiving a dedicated uplink control information transmission indicating uplink feedback regarding reception of the reactivation DCI.

Some aspects of the present disclosure include non-transitory computer readable media having instructions stored therein that, when executed by one or more processors of a BS, cause the one or more processors to perform the steps of transmitting a reactivation downlink control information (DCI) associated with a new periodic resource configuration and a DCI-specific uplink feedback resource, and receiving a dedicated uplink control information transmission indicating uplink feedback regarding reception of the reactivation DCI.

Aspects of the present disclosure include methods for transmitting a reactivation downlink control information (DCI) including a new periodic resource configuration, transmitting downlink control information, and receiving a scheduled uplink control information transmission including the DCI feedback information indicating feedback regarding reception of the reactivation DCI.

Other aspects of the present disclosure include a BS having a memory, a transceiver, and one or more processors operatively coupled with the memory and the transceiver, the one or more processors configured to perform the steps of transmitting a reactivation downlink control information (DCI) including a new periodic resource configuration, transmitting downlink control information, and receiving a scheduled uplink control information transmission including the DCI feedback information indicating feedback regarding reception of the reactivation DCI.

An aspect of the present disclosure includes a BS including means for transmitting a reactivation downlink control information (DCI) including a new periodic resource configuration, means for transmitting downlink control information, and means for receiving a scheduled uplink control information transmission including the DCI feedback information indicating feedback regarding reception of the reactivation DCI.

Some aspects of the present disclosure include non-transitory computer readable media having instructions stored therein that, when executed by one or more processors of a BS, cause the one or more processors to perform the steps of transmitting a reactivation downlink control information (DCI) including a new periodic resource configuration, transmitting downlink control information, and receiving a scheduled uplink control information transmission including the DCI feedback information indicating feedback regarding reception of the reactivation DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
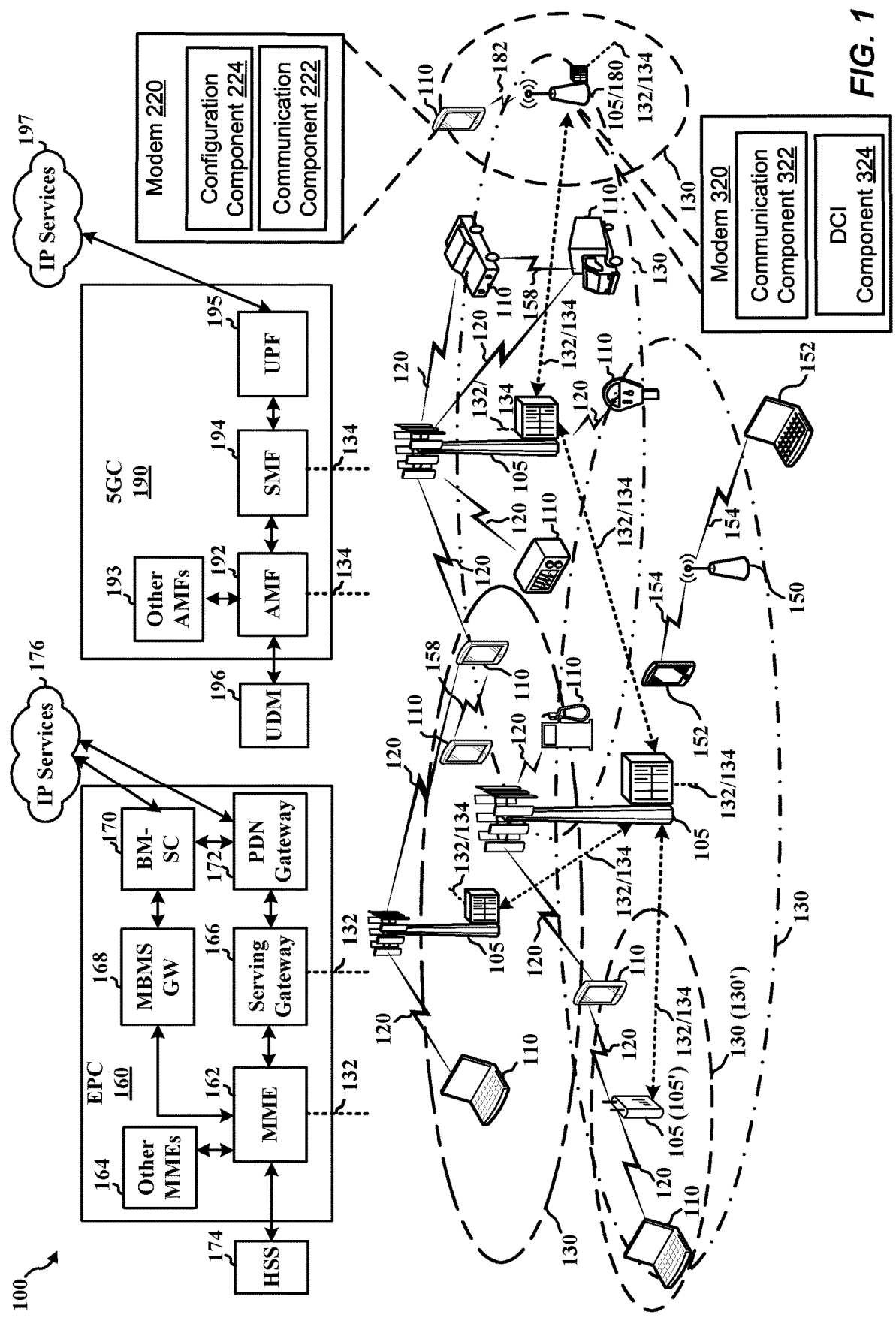
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, modules, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects of the present disclosure, after a UE successfully receives and/or decodes a reactivation DCI transmitted by the BS, the UE may signal the BS regarding a successful reception/decoding (e.g., ACK) by altering one or more subsequent transmission delays between the SPS PDSCH data and the corresponding PUCCH data. In certain aspects, the UE may transmit the ACK in a dedicated PUCCH. In other aspects, the UE may embed the ACK in PUCCH data associated with a SPS PDSCH data.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include a modem 320 that receives and transmits data packets. The modem 320 may include a communication component 322 that transmits reactivation DCI and receives ACK/NACK and/or PUCCH data. The modem 320 may include a DCI component 324 that determines the location, size, and/or format of the ACK/NACK PUCCH data associated with the reactivation DCI. Correspondingly, the UE 110 may include a modem 220 that receives and transmits data packets. The modem 220 may include a communication component 222 that receives the reactivation DCI (e.g., SPS and/or CG) and transmits PUCCH data. The modem 220 may include a configuration component 224 that configures the transmission associated with the PUCCH data by the UE 110. Further details of the present disclosure will be discussed in more detail below.

The BS 105 may include macro cells (high power cellular base station) and/or small cells (low power cellular base station). The macro cells include base stations. The small cells include femtocells, picocells, and microcells.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

ABS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
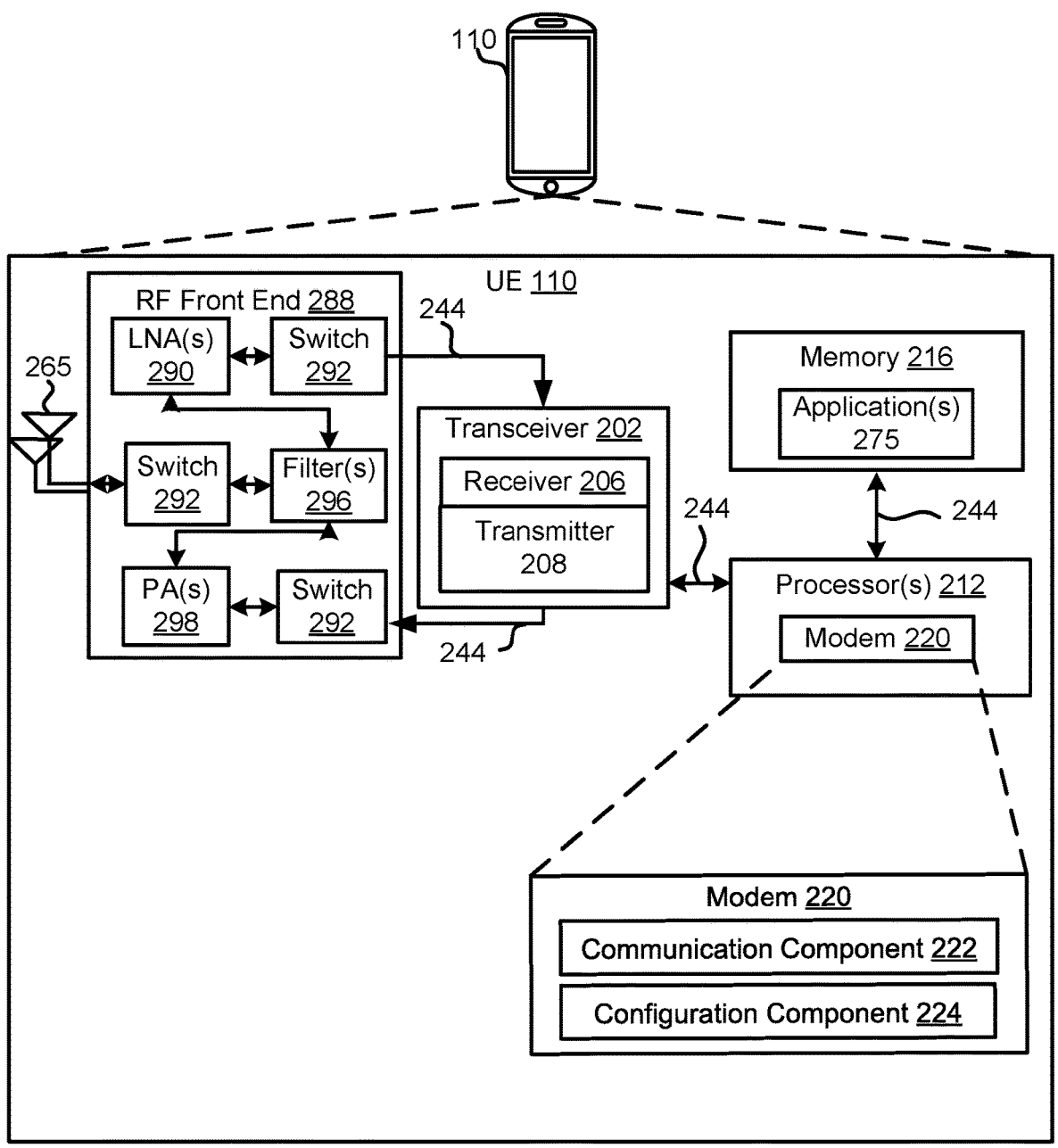
FIG. 2 is a schematic diagram of an example of a user equipment.

Referring to FIG. 2, one example of an implementation of the UE 110 may include a variety of components, some of which have already been described above, but including components such as one or more processors 212 and memory 216 and transceiver 202 in communication via one or more buses 244, which may operate in conjunction with the modem 220, the communication component 222 and/or the configuration component 224 to enable one or more of the functions described herein related to communicating with the BS 105. Further, the one or more processors 212, modem 220, memory 216, transceiver 202, RF front end 288 and one or more antennas 265, may be configured to support voice and/or data messages (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the configuration component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the configuration component 224 and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222 and/or the configuration component 224 and/or one or more of their subcomponents.

Transceiver 202 may include at least one receiver 206 and at least one transmitter 208. Receiving device 206 may include hardware, firmware, and/or software code executable by a processor for receiving data, the code comprising instructions and being stored in a memory (e.g., computer-readable medium). Receiving device 206 may be, for example, a RF receiving device. In an aspect, receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
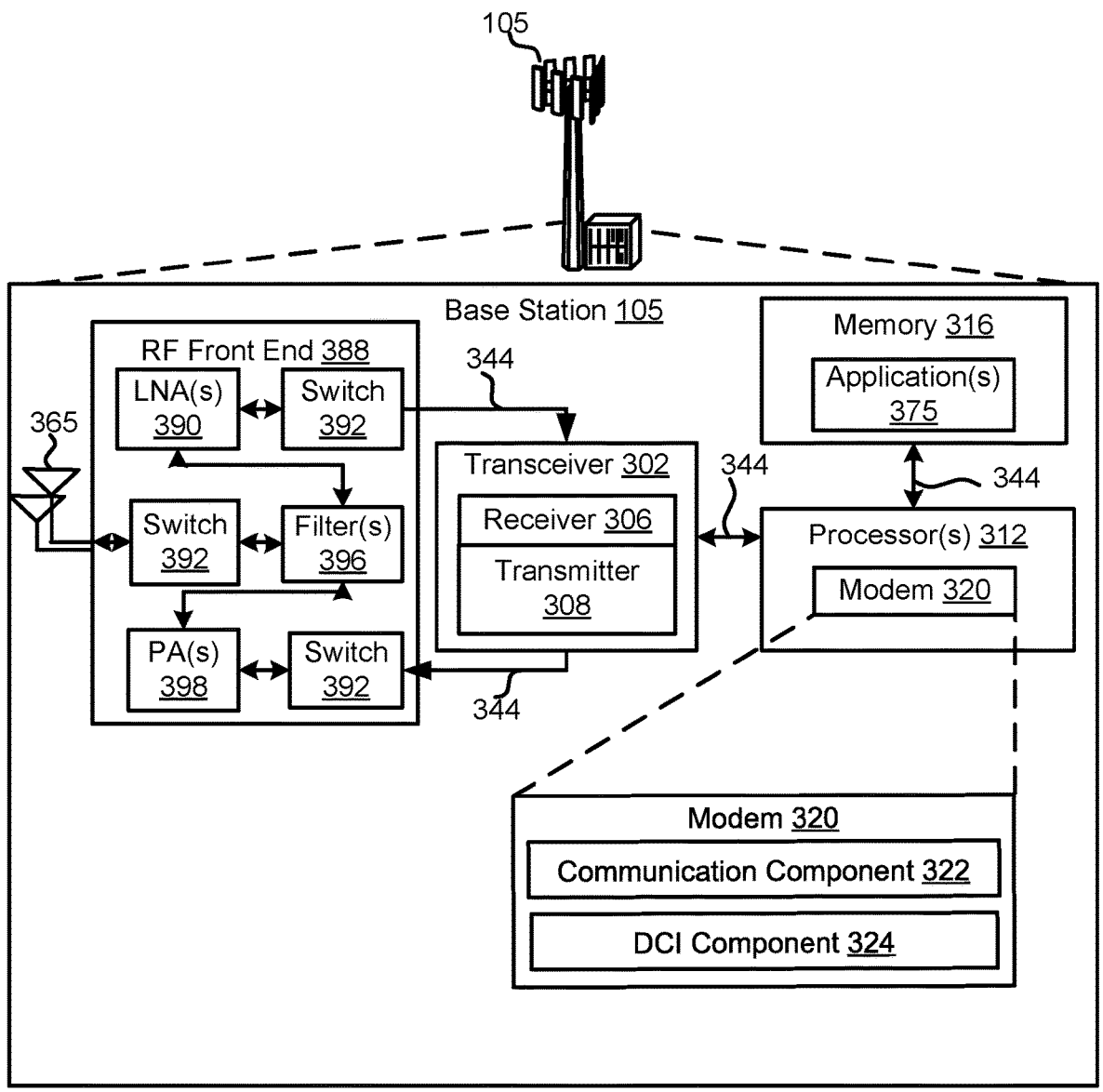
FIG. 3 is a schematic diagram of an example of a base station.

Referring to FIG. 3, one example of an implementation of the BS 105 may include a variety of components, some of which have already been described above, but including components such as one or more processors 312 and memory 316 and transceiver 302 in communication via one or more buses 344, which may operate in conjunction with the modem 320 and the communication component 322, and/or the DCI component 324 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 320 that uses one or more modem processors. The various functions related to the communication component 322, and/or the DCI component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiving device 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
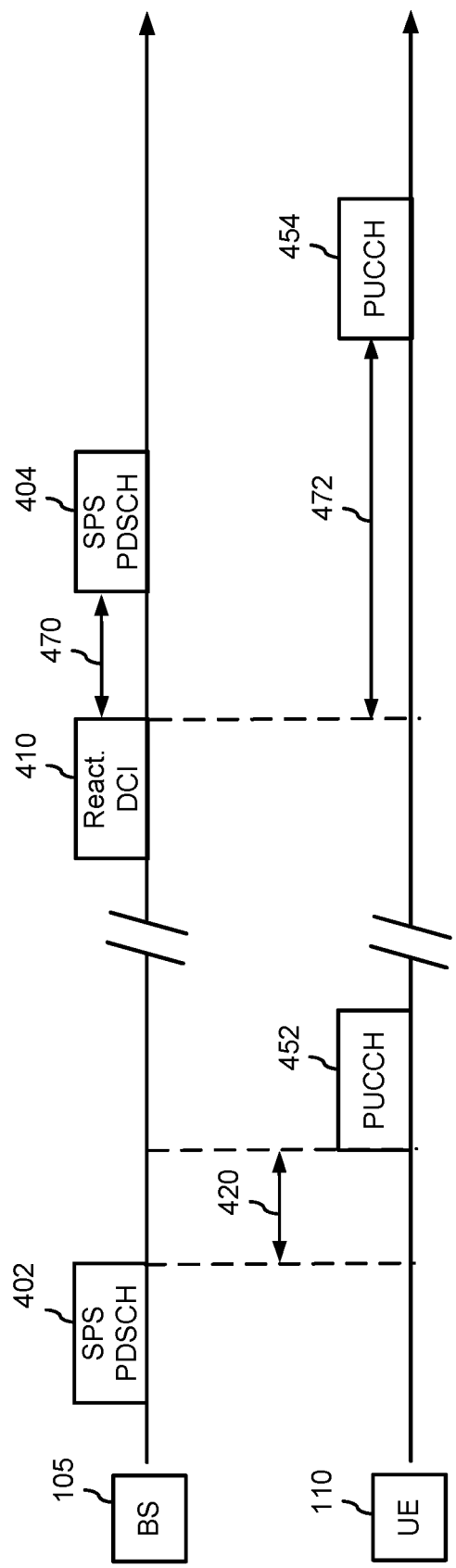
FIG. 4 is an example of a timing diagram illustrating the transmission of a reactivation DCI.

Turning now to FIG. 4, in a conventional communication network, the BS 105 or gNB 180 may transmit SPS physical downlink shared channel (PDSCH) data 402 to the UE 110. In response to receiving the SPS PDSCH data 402, the UE 110 may transmit physical uplink control channel (PUCCH) data 452 to the BS 105. In a non-limiting example, the PUCCH data 452 may include an acknowledgement (ACK) acknowledging the successful reception and/or decoding of the SPS PDSCH data 402 or a negative acknowledgement (NACK) indicating the failed reception and/or decoding of the SPS PDSCH data 402. In an implementation the UE 110 may transmit PUCCH data 452 after a transmission delay 420 from the receiving of the SPS PDSCH data 402. The transmission delay 420 may be 1 slot, 2 slots, 3 slots, 4 slots, 0.1 millisecond (ms), 0.2 ms, 0.5 ms, 1 ms, or other durations.

The BS 105 may transmit another DCI with new parameters, referred to as a reactivation DCI 410, after a previous activation DCI. The reactivation DCI 410 may include updated configuration information for the UE 110, such as updated beamforming information, updated slot information, updated symbol information, or other information relating to the SPS communication between the BS 105 and the UE 110. In a conventional communication network, however, the UE 110 may be unable to acknowledge the successful reception and/or decoding of the reactivation DCI 410 because the conventional communication network does not provide an ACK/NACK data structure for responding to the reactivation DCI 410.

For instance, after the transmission of the reactivation DCI 410, the BS 105 may transmit SPS PDSCH data 404 to the UE 110 according to the updated configuration provided by the reactivation DCI 410. In one example, for instance, the reactivation DCI 410 may configure the transmission of the SPS PDSCH data 404 on a different beam as compared to the beam used for the previous transmission of the SPS PDSCH data 402. In response to receiving the SPS PDSCH data 404, the UE 110 may transmit PUCCH data 454 to the BS 105. In a non-limiting example, the PUCCH data 454 may include an ACK acknowledging the successful reception and/or decoding of the SPS PDSCH data 404 or a NACK indicating the failed reception and/or decoding of the SPS PDSCH data 404. If the UE 110 transmits a NACK, however, the BS 105 may not have a way to know whether the UE 110 successfully received and/or decoded the reactivation DCI 410. For example, even if the UE 110 successfully received and/or decoded the reactivation DCI 410, and the UE 110 updates the configuration information according to the reactivation DCI 410 (e.g., beamforming, slot, symbol), the UE 110 may still fail to receive and/or decode the SPS data. Also, for example, if the UE 110 failed to receive and/or decode the reactivation DCI 410, then the UE 110 may not update the configuration information in the reactivation DCI 410 (e.g., beamforming, slot, symbol), and also may thus not receive/decode the SPS data. Thus, the signaling in the conventional system fails to enable the BS 105 to know if the UE 110 received the reactivation DCI 410. A transmission spacing 470, which may be referred to as a K0 value, may be defined as a time gap between DL (reactivation DCI) grant and corresponding DL data (PDSCH) reception. A feedback spacing 472, which may be referred to as a K2 value, may be defined as a time gap between DL (reactivation DCI) grant and UL feedback transmission.

Figure 5:
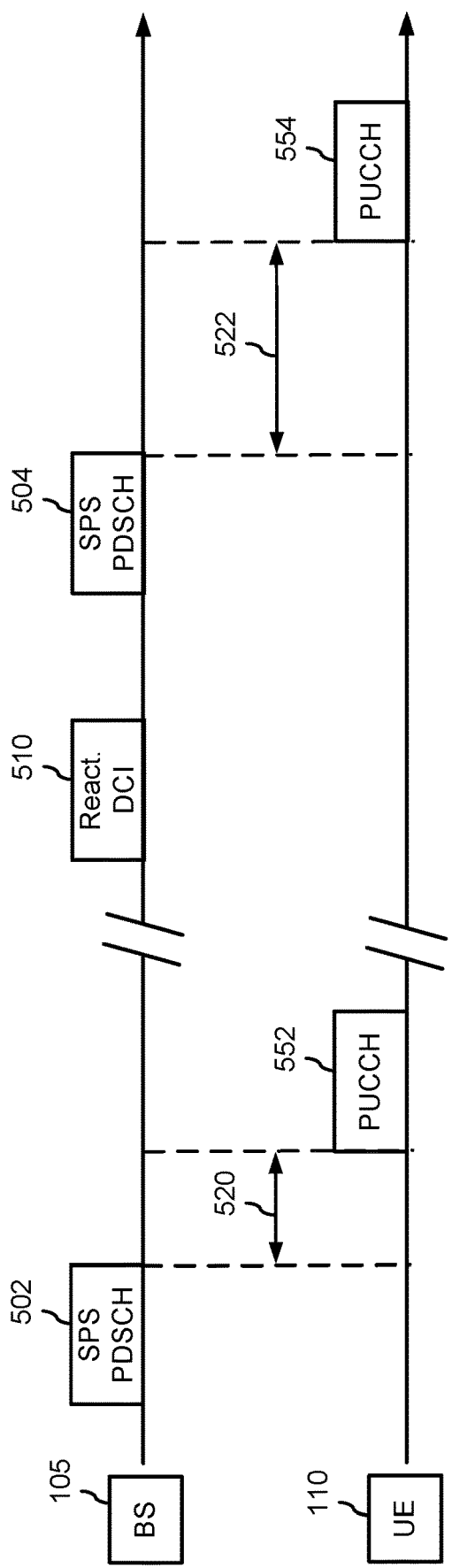
FIG. 5 is an example of a timing diagram illustrating a first method of signaling the successful reception and/or decoding of a reactivation DCI.

Referring to FIG. 5, the UE 110 may signal the successful reception and/or decoding of a reactivation DCI by changing the transmission delay for one or more of the subsequent PUCCH data. In other words, without introducing new signaling, the BS 105 or gNB 180 can modify UL feedback parameters, e.g. a new K1 value, in an SPS reactivation DCI. For example, in an aspect of the present disclosure, the BS 105 or gNB 180 may transmit SPS PDSCH data 502 to the UE 110. In response to receiving the SPS PDSCH data 502, the UE 110 may transmit PUCCH data 552 to the BS 105. In a non-limiting example, the PUCCH data 552 may include an ACK acknowledging the successful reception and/or decoding of the SPS PDSCH data 502 or a NACK indicating the failed reception and/or decoding of the SPS PDSCH data 502. The UE 110 may transmit PUCCH data 552 after waiting a first transmission delay 520 after receiving the SPS PDSCH data 502. The first transmission delay 520, which may be referred to as a K1 value and defined as a delay in a transmission time interval between DL data (PDSCH) reception and a corresponding UL feedback transmission, may be 1 slot, 2 slots, 3 slots, 4 slots, 0.1 millisecond (ms), 0.2 ms, 0.5 ms, 1 ms, or other durations.

After the transmission of the PUCCH data 552, the BS 105 may transmit a reactivation DCI 510. The reactivation DCI 510 may include configuration information for the UE 110, such as updated beamforming information, updated slot information, updated symbol information, or other information relating to the SPS communication between the BS 105 and the UE 110. The BS 105 may transmit SPS PDSCH data 504 to the UE 110 after the transmission of the reactivation DCI 510. In response to receiving the SPS PDSCH data 504, the UE 110 may transmit PUCCH data 554 to the BS 105. In a non-limiting example, the PUCCH data 554 may include an ACK acknowledging the successful reception and/or decoding of the SPS PDSCH data 504 or a NACK indicating the failed reception and/or decoding of the SPS PDSCH data 504.

In some implementations, the UE 110 may successfully receive and/or decode the reactivation DCI 510. In order to signal to the BS 105 that the UE 110 successfully receives/decodes the reactivation DCI 510, the UE 110 may transmit the PUCCH data 554 at a second transmission delay 522 after the SPS PDSCH data 504. The second transmission delay 522 may be different than the first transmission delay 520. The second transmission delay 522 may be 2 slots, 3 slots, 4 slots, 5 slots, 0.2 ms, 0.5 ms, 1 ms, 2 ms, or other durations. In one implementation, the duration of the second transmission delay 522 may be indicated in the reactivation DCI 510. In another aspect, the duration of the second transmission delay 522 may be predetermined by the communication network. In some examples, the duration of the second transmission delay 522 may be predetermined in one or more codebooks transmitted by the BS 105 to the UE 110 prior to the transmission of the reactivation DCI 510.

In a non-limiting example, the UE 110 may transmit the PUCCH data 554 at the second transmission delay 522 after the SPS PDSCH data 504, and any subsequent PUCCH data (not shown) at the first transmission delay 520 after the corresponding SPS PDSCH data (not shown). In other non-limiting examples, the UE 110 may transmit the PUCCH data 554 at the second transmission delay 522 after the SPS PDSCH data 504, and any subsequent PUCCH data (not shown) at the second transmission delay 522 after the corresponding SPS PDSCH data (not shown).

In some implementations, a duration of the second transmission delay 522 may be dynamically determined by the uplink and/or downlink channel quality(ies). For example, if the downlink channel (e.g., PDSCH) quality, as reported by one or more channel quality indicator (CQI) reports transmitted by the UE 110 to the BS 105, is below a predetermined threshold, the second transmission delay 522 may be shorter than the first transmission delay 520. In another example, if the downlink channel quality is above a predetermined threshold, the second transmission delay 522 may be longer than the first transmission delay 520. Other algorithms may be used to determine the duration of the second transmission delay 522.

In certain examples, one or more other parameters associated with the transmission of the PUCCH data 554 may be changed, additionally or alternatively to the second transmission delay 522, to signal the BS 105 the successful reception/decoding of the reactivation DCI 510. For example, the location (e.g., symbol and/or slot locations), size, and/or format (e.g., number of symbols, numbers of resource blocks, range of number of symbols, range of number of resource blocks, range of uplink control beats) may be changed to signal the successful reception/decoding of the reactivation DCI 510.

In other implementations, the UE 110 may have failed to receive and/or decode the reactivation DCI 510. In order to signal to the BS 105 that the UE 110 failed to receive/decode the reactivation DCI 510, the UE 110 may transmit the PUCCH data 554 at the first transmission delay 520 after the SPS PDSCH data 504.

Figure 6:
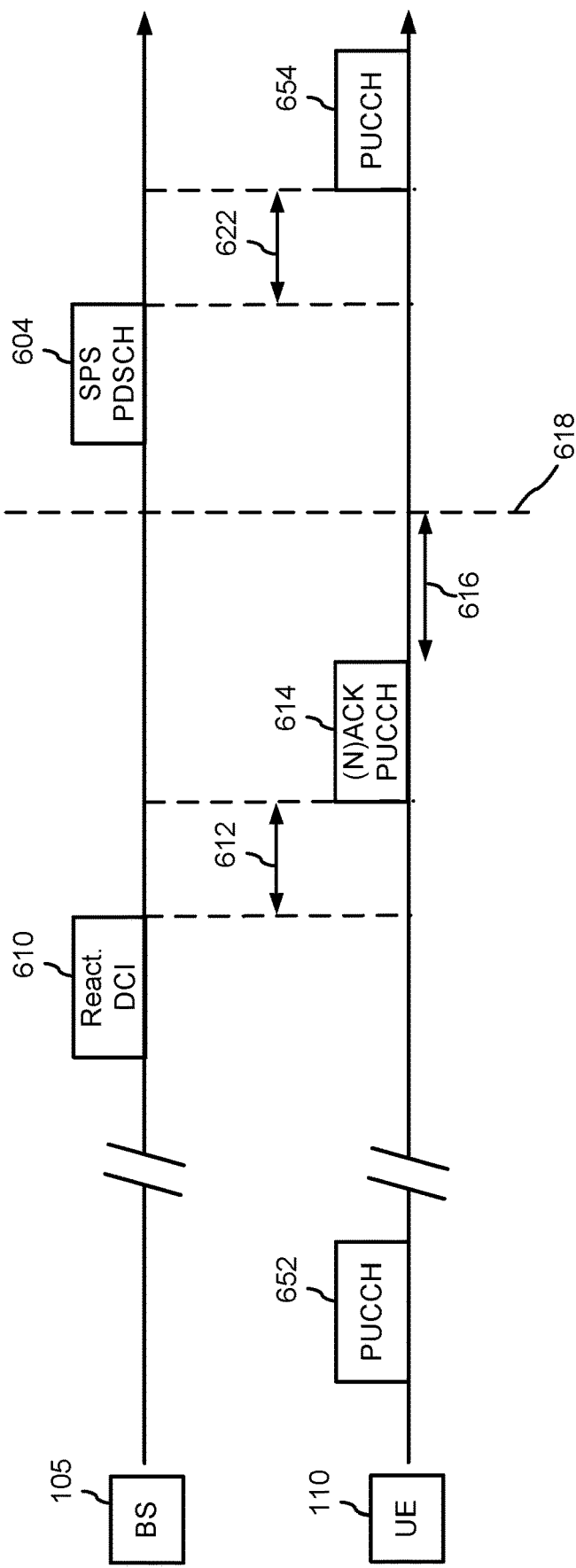
FIG. 6 is an example of a timing diagram illustrating a second method of signaling the successful reception and/or decoding of a reactivation DCI.

Turning now to FIG. 6, in some implementations, the UE 110 may signal the successful reception and/or decoding of a reactivation DCI by transmitting dedicated PUCCH data to the BS 105. In other words, to improve reliability, the activation/reactivation SPS DCI can indicate its own UL feedback resource, different from that for SPS data. For example, in an aspect of the present disclosure, the BS 105, such as the gNB 180, may transmit SPS PDSCH data 604 to the UE 110. In response to receiving the SPS PDSCH data 604, the UE 110 may transmit PUCCH data 652 to the BS 105. In a non-limiting example, the PUCCH data 652 may include an ACK acknowledging the successful reception and/or decoding of the SPS PDSCH data 604 or a NACK indicating the failed reception and/or decoding of the SPS PDSCH data 604.

In some implementations, after the transmission of the PUCCH data 652, the BS 105 may transmit a reactivation DCI 610. The reactivation DCI 610 may include configuration information for the UE 110, such as updated beamforming information, updated slot information, updated symbol information, or other information relating to the SPS communication between the BS 105 and the UE 110. In certain implementations, the UE 110 may successfully receive and/or decode the reactivation DCI 610. In order to signal to the BS 105 that the UE 110 successfully receives/decodes the reactivation DCI 610, the UE 110 may transmit ACK/NACK PUCCH data 614 at a first transmission delay 612 after the reactivation DCI 610. The ACK/NACK PUCCH data 614 may include an ACK acknowledging the successful reception and/or decoding of the reactivation DCI 610. The first transmission delay 612 may be 2 slots, 3 slots, 4 slots, 5 slots, 0.2 ms, 0.5 ms, 1 ms, 2 ms, or other durations. The reactivation DCI 610 may include ACK/NACK information indicating the location (e.g., symbol and/or slot locations), size, and/or format (e.g., number of symbols, numbers of resource blocks, range of number of symbols, range of number of resource blocks, range of uplink control beats) of the ACK/NACK PUCCH data 614. The ACK/NACK information may be transmitted by an unused field (e.g., PUCCH resource indicator), one or more reserved bits, or a new field in the reactivation DCI 610. The ACK/NACK information may include a PUCCH resource identification (ID) for the reactivation DCI 610.

In some implementations, after the UE 110 transmits the ACK/NACK PUCCH data 614, the UE 110 may begin performing any transmission and/or reception based on the configuration information in the reactivation DCI 610 after an action time 618. The action time 618 may be a time when the BS 105 and the UE 110 are synchronized regarding when the new SPS parameters are ready to be implemented. The action time 618 may occur a second transmission delay 616 after the transmission of the ACK/NACK PUCCH data 614. In one implementation, the duration of the second transmission delay 616 may be indicated in the reactivation DCI 610. In another aspect, the duration of the second transmission delay 616 may be predetermined by the communication network. In some examples, the duration of the second transmission delay 616 may be predetermined in one or more codebooks transmitted by the BS 105 to the UE 110 prior to the transmission of the reactivation DCI 610.

The BS 105 may transmit SPS PDSCH data 604 to the UE 110 after the transmission of the ACK/NACK PUCCH data 614. In response to receiving the SPS PDSCH data 604, the UE 110 may transmit PUCCH data 654 to the BS 105. In a non-limiting example, the PUCCH data 654 may include an ACK acknowledging the successful reception and/or decoding of the SPS PDSCH data 604 or a NACK indicating the failed reception and/or decoding of the SPS PDSCH data 604. The UE 110 may transmit the PUCCH data 654 at a third transmission delay 622 after the reactivation DCI 610. In one implementation, the duration of the third transmission delay 622 may be indicated in the reactivation DCI 610. In another aspect, the duration of the third transmission delay 622 may be predetermined by the communication network. In some examples, the duration of the third transmission delay 622 may be predetermined in one or more codebooks transmitted by the BS 105 to the UE 110 prior to the transmission of the reactivation DCI 610.

In some implementations, the PUCCH data 654 may be transmitted based on the configuration information in the reactivation DCI 610. For example, the PUCCH data 654 may be transmitted based on the beamforming configuration indicated in the reactivation DCI 610. In another example, the PUCCH data 654 may be transmitted based on the slot and/or symbol location indicated in the reactivation DCI 610.

In some instances, the UE 110 may fail to receive and/or decode the reactivation DCI 610. In order to signal to the BS 105 that the UE 110 failed to receive/decode the reactivation DCI 610, the UE 110 may transmit the ACK/NACK PUCCH data 614 at the first transmission delay 612 after the reactivation DCI 610. The ACK/NACK PUCCH data 614 may include a NACK acknowledging the failed reception and/or decoding of the reactivation DCI 610. Subsequent PUCCH data, such as the PUCCH data 654 may be transmitted based on the same configuration information as the PUCCH data 652 due to the failure to receive/decode the updated configuration information in the reactivation DCI 610.

In an aspect of the present disclosure, the first transmission delay 612 may be used only for the delay between the reactivation DCI 610 and the ACK/NACK PUCCH data 614. The third transmission delay 622 may be used only for the delay between the SPS PDSCH data, such as the SPS PDSCH data 604, and the corresponding PUCCH data, such as the PUCCH data 654.

Figure 7:
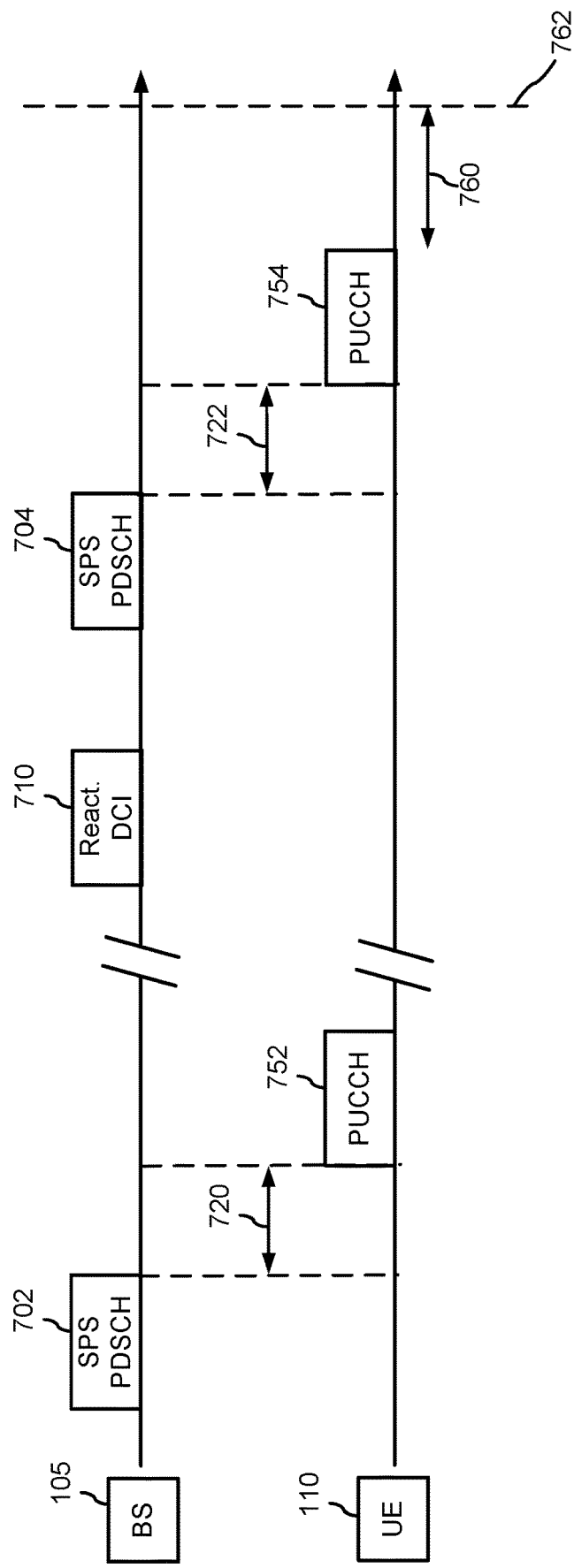
FIG. 7 is an example of a timing diagram illustrating a third method of signaling the successful reception and/or decoding of a reactivation DCI.

Turning to FIG. 7, the UE 110 may signal the successful reception and/or decoding of a reactivation DCI by appending one or more ACK/NACKs in PUCCH data responding to SPS PDSCH data. In other words, without using an additional UL feedback resource, an ACK/NACK for an activation/reactivation DCI reuses a same uplink feedback resource for a scheduled SPS PDSCH after the DCI to carry the corresponding new DCI feedback information. For example, in an aspect of the present disclosure, the BS 105, such as the gNB 180, may transmit SPS PDSCH data 702 to the UE 110. In response to receiving the SPS PDSCH data 702, the UE 110 may transmit PUCCH data 752 to the BS 105. In a non-limiting example, the PUCCH data 752 may include an ACK acknowledging the successful reception and/or decoding of the SPS PDSCH data 702 or a NACK indicating the failed reception and/or decoding of the SPS PDSCH data 702. The UE 110 may transmit PUCCH data 752 a first transmission delay 720 after receiving the SPS PDSCH data 702. The first transmission delay 720 may be 1 slot, 2 slots, 3 slots, 4 slots, 0.1 millisecond (ms), 0.2 ms, 0.5 ms, 1 ms, or other durations.

After the transmission of the PUCCH data 752, the BS 105 may transmit a reactivation DCI 710. The reactivation DCI 710 may include configuration information for the UE 110, such as updated beamforming information, updated slot information, updated symbol information, or other information relating to the SPS communication between the BS 105 and the UE 110. The BS 105 may transmit SPS PDSCH data 704 to the UE 110 after the transmission of the reactivation DCI 710. In response to receiving the SPS PDSCH data 704, the UE 110 may transmit PUCCH data 754 to the BS 105 at a second transmission delay 722 after the SPS PDSCH data 704. The second transmission delay 722 may be the same or different than the first transmission delay 720. The second transmission delay 722 may be 1 slot, 2 slots, 3 slots, 4 slots, 0.1 millisecond (ms), 0.2 ms, 0.5 ms, 1 ms, or other durations. In a non-limiting example, the PUCCH data 754 may include an ACK acknowledging the successful reception and/or decoding of the SPS PDSCH data 704 or a NACK indicating the failed reception and/or decoding of the SPS PDSCH data 704.

In some implementations, the UE 110 may successfully receive and/or decode the reactivation DCI 710. In order to signal to the BS 105 that the UE 110 successfully receives/decodes the reactivation DCI 710, the UE 110 may append one or more ACK bits associated with an ACK for the reactivation DCI 710 in the PUCCH data 754 prior to transmitting the PUCCH data 754. The ACK for the reactivation DCI 710 may be different than the ACK acknowledging the successful reception and/or decoding of the SPS PDSCH data 704. The ACK for the reactivation DCI 710 may increase the data size of the PUCCH data 754.

In certain aspects, the UE 110 may respond to more than one reactivation DCIs. The UE 110 may transmit more than one ACKs to the BS 105 in the PUCCH data 754. For example, if the BS 105 transmits three reactivation DCIs to the UE 110, and the UE 110 only receives/decodes the first and the third reactivation DCIs, the UE 110 may transmit 1-0-1, in the PUCCH data 754, to BS 105 to indicate the successful reception/decoding of the first and third reactivation DCIs ("1" bits) and the failed reception/decoding of the second reactivation DCI ("0" bit).

In some non-limiting examples, the BS 105 may allocate additional resources for the ACK for the reactivation DCI 710 only in the PUCCH data corresponding to the first scheduled SPS PDSCH after the reactivation DCI 710 (i.e., the PUCCH data 754 for the SPS PDSCH 704). In other examples, the additional resources may be allocated for every PUCCH data to accommodate ACK or NACK associated with potential reactivation DCI. In certain examples, a fixed number of additional resources may be allocated for every PUCCH data to accommodate ACK or NACK associated with potential reactivation DCI, and additional resources may be dynamically allocated if necessary.

In some implementations, after the UE 110 transmits the PUCCH data 754, the UE 110 may begin performing any transmission and/or reception based on the configuration information in the reactivation DCI 710 after an action time 762. The action time 762 may be a time when the BS 105 and the UE 110 are synchronized regarding when the new SPS parameters are ready to be implemented. The action time 762 may occur a third transmission delay 760 after the transmission of the PUCCH data 754. In one implementation, the duration of the third transmission delay 760 may be indicated in the reactivation DCI 710. In another aspect, the duration of the third transmission delay 760 may be predetermined by the communication network. In some examples, the duration of the third transmission delay 760 may be predetermined in one or more codebooks transmitted by the BS 105 to the UE 110 prior to the transmission of the reactivation DCI 710.

In other implementations, the UE 110 may have failed to receive and/or decode the reactivation DCI 710. In order to signal to the BS 105 that the UE 110 failed to receive/decode the reactivation DCI 710, the UE 110 may append one or more NACK bits associated with a NACK for the reactivation DCI 710 in the PUCCH data 754. The NACK for the reactivation DCI 710 may be different than the NACK acknowledging the failed reception and/or decoding of the SPS PDSCH data 704. The NACK for the reactivation DCI 710 may increase the data size of the PUCCH data 754.

In some implementations, the ACK and/or NACK for the reactivation DCI may be carried in physical uplink shared control channel (PUSCH) data from the UE 110 to the BS 105.

In some instances, if the UE 110 does not successfully receive or decode the configuration information in the reactivation DCI, the UE 110 may not transmit a NACK.

In some aspects of the present disclosure, the ACK or NACK for the reactivation DCI may be indicated by different cyclic shifts or other physical layer identifiers associated with the PUCCH.

In an aspect, an initial SPS PDSCH (before reactivation) and a reactivated SPS PDSCH (after reactivation) may have different time domain resource allocation. For example, the initial SPS PDSCH and the reactivated SPS PDSCH may occur in the same or different slots.

In certain implementations, the reactivation DCI may be used for SPS (as described above) or CG.

Figure 8:
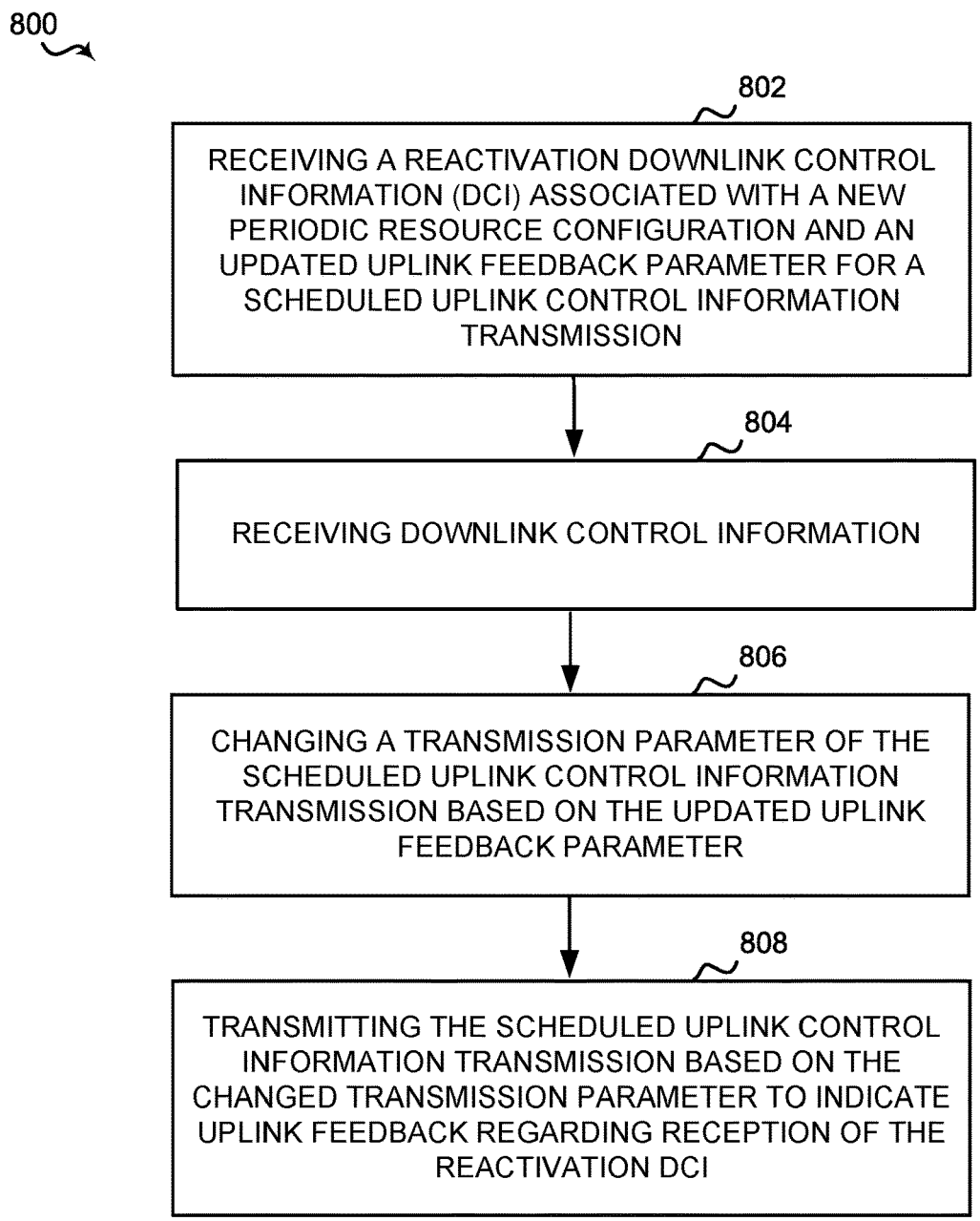
FIG. 8 is a process flow diagram of an example of a first method of signaling the successful reception of a reactivation DCI.

Referring to FIG. 8, an example of a method 800 for signaling the successful reception and/or decoding of a reactivation DCI may be performed by the UE 110 in the wireless communication network 100.

At block 802, the method 800 may receive a reactivation downlink control information (DCI) associated with a new periodic resource configuration and an updated uplink feedback parameter for a scheduled uplink control information transmission. For example, the communication component 222, the modem 220, and/or the processor 212 of the UE 110 may receive a reactivation DCI, such as the reactivation DCI 510 from the BS 105. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the reactivation DCI 510, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving a reactivation downlink control information (DCI) associated with a new periodic resource configuration and an updated uplink feedback parameter for a scheduled uplink control information transmission At block 804, the method 800 may receive downlink control information. For example, the communication component 222, the modem 220, and/or the processor 212 of the UE 110 may receive the SPS PDSCH 504 from the BS 105. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the downlink control information, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving downlink control information.

At block 806, the method 800 may change a transmission parameter of the scheduled uplink control information transmission based on the updated uplink feedback parameter. For example, the configuration component 224, the modem 220, and/or the processor 212 of the UE 110 may change the transmission delay of the PUCCH data 554 from the first transmission delay 520 to the second transmission delay 522.

In certain implementations, the processor 212, the modem 220, the communication component 222, the transceiver 202, the receiver 206, the transmitter 208, the RF front end 288, and/or the subcomponents of the RF front end 288 may be configured to and/or may define means for changing a transmission parameter of the scheduled uplink control information transmission based on the updated uplink feedback parameter.

At block 808, the method 800 may transmit the scheduled uplink control information transmission based on the changed transmission parameter to indicate uplink feedback regarding reception of the reactivation DCI. For example, the configuration component 224, the modem 220, and/or the processor 212 of the UE 110 may transmit the PUCCH data 554 at the second transmission delay 522 after the SPS PDSCH data 504. The communication component 222 may send the PUCCH data 554 to the transceiver 202 or the transmitter 208. The transceiver 202 or the transmitter 208 may convert the digital data of the PUCCH data 554 into electrical signals, and send the electrical signals to the RF front end 288. The RF front end 288 may filter, amplify, and/or convert the electrical signals into electro-magnetic signals. The one or more antennas 265 may transmit the electro-magnetic signals.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting the scheduled uplink control information transmission based on the changed transmission parameter to indicate uplink feedback regarding reception of the reactivation DCI.

Figure 9:
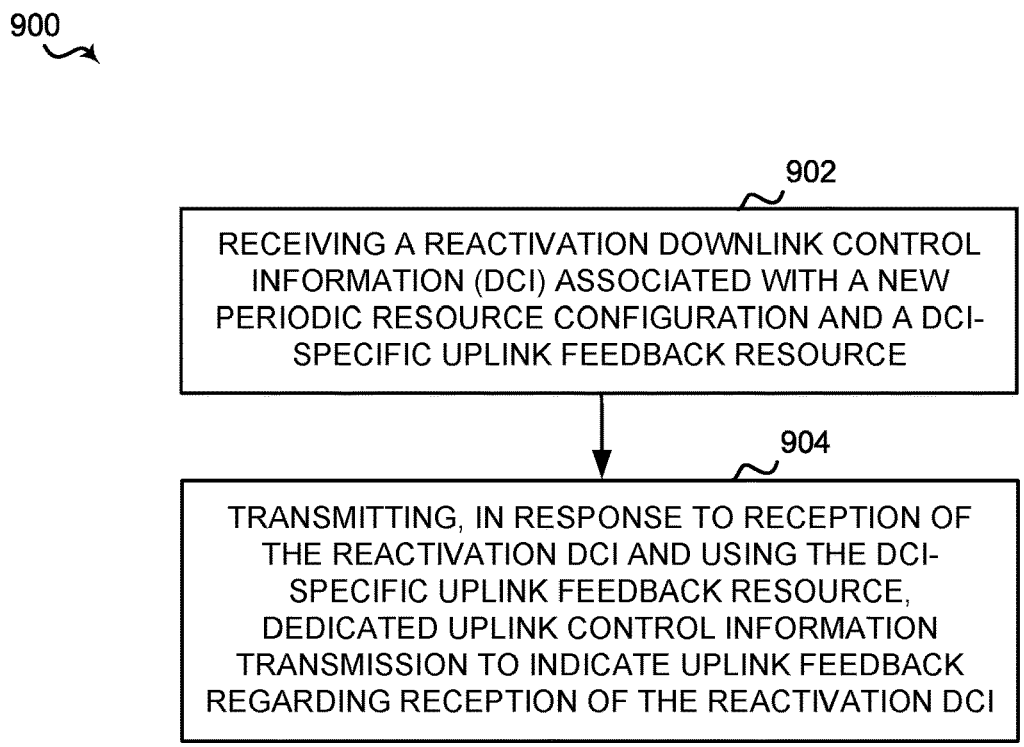
FIG. 9 is a process flow diagram of an example of a second method of signaling the successful reception of a reactivation DCI.

Referring to FIG. 9, an example of a method 900 for signaling the successful reception and/or decoding of a reactivation DCI may be performed by the UE 110 in the wireless communication network 100.

At block 902, the method 900 may receive a reactivation downlink control information (DCI) associated with a new periodic resource configuration and a DCI-specific uplink feedback resource. For example, the communication component 222, the modem 220, and/or the processor 212 of the UE 110 may receive a reactivation DCI, such as the reactivation DCI 610 from the BS 105. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the reactivation DCI 610, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving a reactivation downlink control information (DCI) associated with a new periodic resource configuration and a DCI-specific uplink feedback resource At block 904, the method 900 may transmit, in response to reception of the reactivation DCI and using the DCI-specific uplink feedback resource, dedicated uplink control information transmission to indicate uplink feedback regarding reception of the reactivation DCI. For example, the communication component 222, the modem 220, and/or the processor 212 of the UE 110 may transmit the ACK/NACK PUCCH data 614 the reception of the reactivation DCI 610. The communication component 222 may send the ACK/NACK PUCCH data 614 to the transceiver 202 or the transmitter 208. The transceiver 202 or the transmitter 208 may convert the digital data of the ACK/NACK PUCCH data 614 into electrical signals, and send the electrical signals to the RF front end 288. The RF front end 288 may filter, amplify, and/or convert the electrical signals into electro-magnetic signals. The one or more antennas 265 may transmit the electro-magnetic signals.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting, in response to reception of the reactivation DCI and using the DCI-specific uplink feedback resource, dedicated uplink control information transmission to indicate uplink feedback regarding reception of the reactivation DCI.

Figure 10:
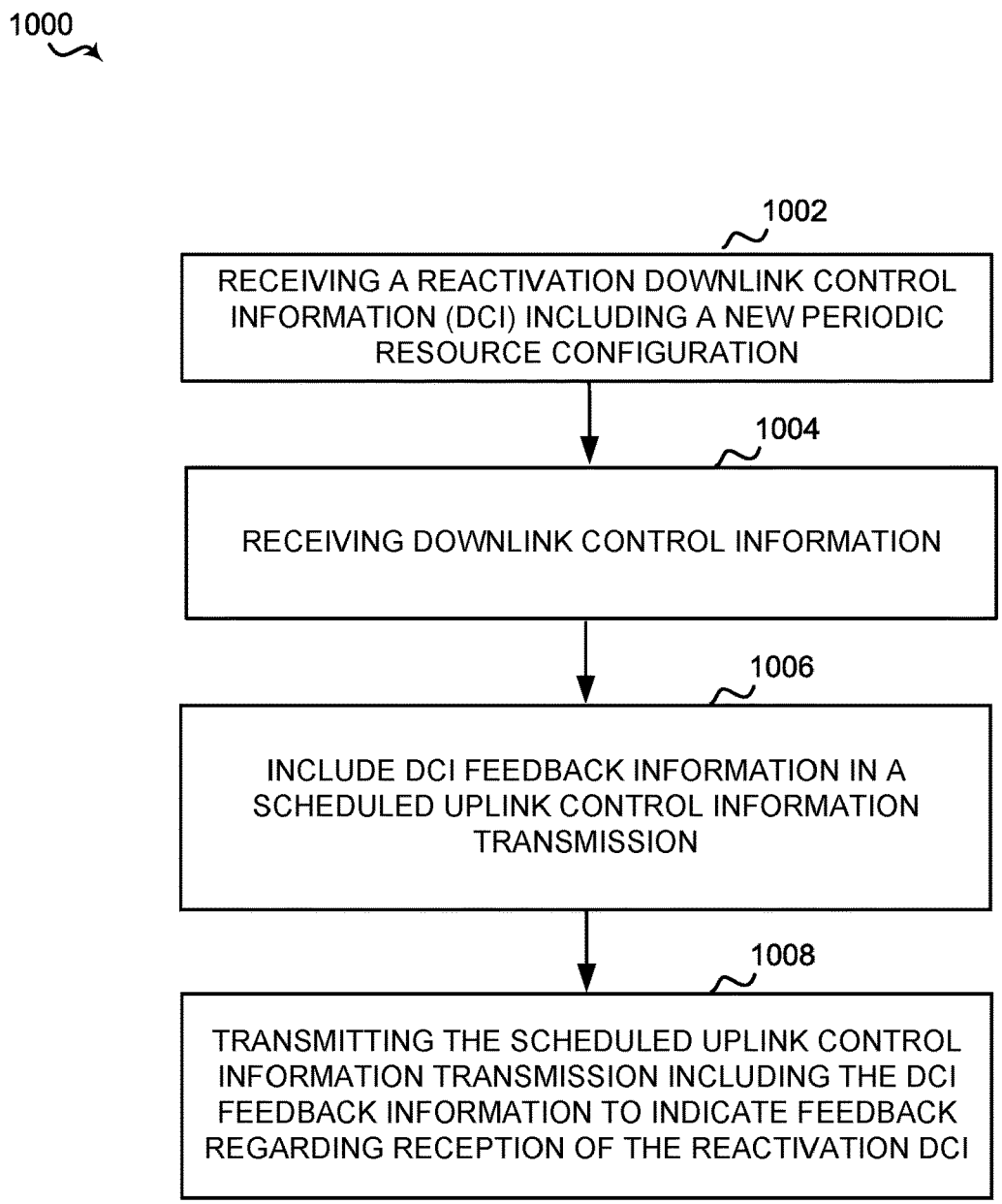
FIG. 10 is a process flow diagram of an example of a third method of signaling the successful reception of a reactivation DCI.

Referring to FIG. 10, an example of a method 1000 for signaling the successful reception and/or decoding of a reactivation DCI may be performed by the UE 110 in the wireless communication network 100.

At block 1002, the method 1000 may receive a reactivation downlink control information (DCI) including a new periodic resource configuration. For example, the communication component 222, the modem 220, and/or the processor 212 of the UE 110 may receive a reactivation DCI, such as the reactivation DCI 710 from the BS 105. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the reactivation DCI 710, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving a reactivation downlink control information (DCI) including a new periodic resource configuration.

At block 1004, the method 1000 may receive downlink control information. For example, the communication component 222, the modem 220, and/or the processor 212 of the UE 110 may receive the SPS PDSCH 704 from the BS 105. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the downlink control information, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving downlink control information.

At block 1006, the method 1000 may include DCI feedback information in a scheduled uplink control information transmission. For example, the configuration component 224, the modem 220, and/or the processor 212 of the UE 110 may include one or more ACK bits associated with the ACK for the reactivation DCI 710 to the PUCCH data 754.

In certain implementations, the processor 212, the modem 220, and/or the configuration component 224 may be configured to and/or may define means for including DCI feedback information in a scheduled uplink control information transmission.

At block 1008, the method 1000 may transmit the scheduled uplink control information transmission including the DCI feedback information to indicate feedback regarding reception of the reactivation DCI. For example, the communication component 222, the modem 220, and/or the processor 212 of the UE 110 may transmit the PUCCH data 754 including the appended ACK for the reactivation DCI 710. The communication component 222 may send the PUCCH data 754 including the appended ACK for the reactivation DCI 710 to the transceiver 202 or the transmitter 208. The transceiver 202 or the transmitter 208 may convert the digital data of the PUCCH data 754 including the appended ACK for the reactivation DCI 710 into electrical signals, and send the electrical signals to the RF front end 288. The RF front end 288 may filter, amplify, and/or convert the electrical signals into electro-magnetic signals. The one or more antennas 265 may transmit the electro-magnetic signals.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting the scheduled uplink control information transmission including the DCI feedback information to indicate feedback regarding reception of the reactivation DCI.

Alternatively or additionally, the method 1000 may include any of the methods above, wherein changing the transmission parameter further comprises changing a transmission delay from a first duration to a second duration and wherein transmitting the scheduled uplink control information transmission further comprises transmitting after waiting the second duration after receiving the downlink control information.

Alternatively or additionally, the method 1000 may include any of the methods above, further comprising determining a channel quality of a downlink control channel and determining the second duration of the transmission delay based on the channel quality.

Alternatively or additionally, the method 1000 may include any of the methods above, wherein the reactivation DCI comprises a semi-persistent schedule reactivation DCI or a configuration grant reactivation DCI.

Alternatively or additionally, the method 1000 may include any of the methods above, wherein changing the transmission parameter based on the updated uplink feedback parameter includes changing at least one of a transmission delay associated with transmitting the scheduled uplink control information transmission, a resource location of the scheduled uplink control information transmission, a resource size of the scheduled uplink control information transmission, or a resource format of the scheduled uplink control information transmission.

Figure 11:
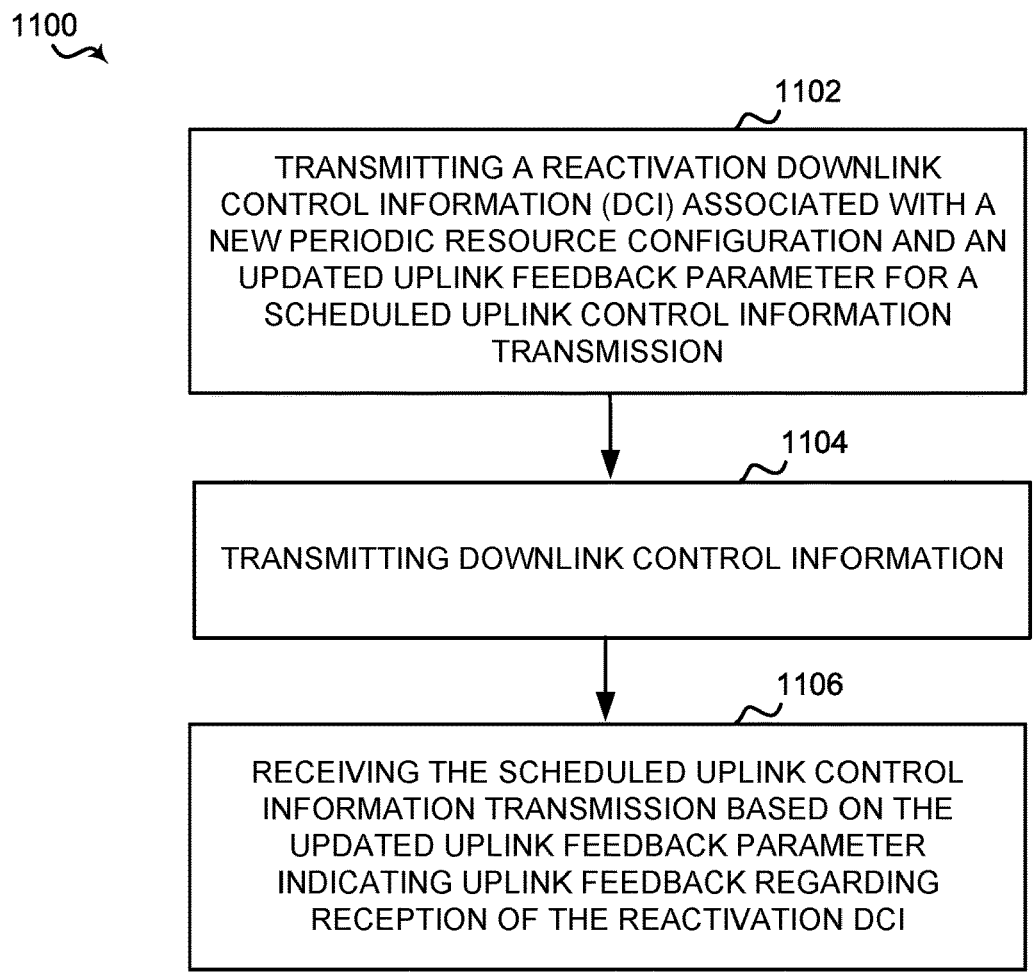
FIG. 11 is a process flow diagram of an example of a first method of receiving an indication of the successful reception of a reactivation DCI.

Referring to FIG. 11, an example of a method 1100 for receiving an indication of the successful reception and/or decoding of a reactivation DCI by the UE 110 may be performed by the BS 105 in the wireless communication network 100.

At block 1102, the method 1100 may transmit a reactivation downlink control information (DCI) associated with a new periodic resource configuration and an updated uplink feedback parameter for a scheduled uplink control information transmission. For example, the communication component 322, the modem 320, and/or the processor 312 of the BS 105 may transmit a reactivation DCI, such as the reactivation DCI 510. The communication component 322 may send the reactivation DCI 510 to the transceiver 302 or the transmitter 308. The transceiver 302 or the transmitter 308 may convert the digital data of the reactivation DCI 510 into electrical signals, and send the electrical signals to the RF front end 388. The RF front end 388 may filter, amplify, and/or convert the electrical signals into electro-magnetic signals. The one or more antennas 365 may transmit the electro-magnetic signals.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting a reactivation downlink control information (DCI) associated with a new periodic resource configuration and an updated uplink feedback parameter for a scheduled uplink control information transmission.

At block 1104, the method 1100 may transmit downlink control information. For example, the communication component 322, the modem 320, and/or the processor 312 of the BS 105 may transmit a downlink control information, such as the SPS PDSCH data 504. The communication component 322 may send the SPS PDSCH data 504 to the transceiver 302 or the transmitter 308. The transceiver 302 or the transmitter 308 may convert the digital data of the SPS PDSCH data 504 into electrical signals, and send the electrical signals to the RF front end 388. The RF front end 388 may filter, amplify, and/or convert the electrical signals into electro-magnetic signals. The one or more antennas 365 may transmit the electro-magnetic signals.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting downlink control information.

At block 1106, the method 1100 may receive the scheduled uplink control information transmission based on the updated uplink feedback parameter indicating uplink feedback regarding reception of the reactivation DCI. For example, the communication component 322, the modem 320, and/or the processor 312 of the BS 105 may receive the PUCCH data 554 at a transmission delay specified in the reactivation DCI. The one or more antennas 365 may receive electro-magnetic signals from one or more antennas 365 of the UE 110. The RF front end 388 may filter, amplify, and/or extract electrical signals carried by the electro-magnetic signals. The transceiver 302 or the receiver 306 may digitize and convert the electrical signal into the data, such as the PUCCH data 554, and send to the communication component 322.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving scheduled uplink control information transmission based on the updated uplink feedback parameter indicating uplink feedback regarding reception of the reactivation DCI.

Figure 12:
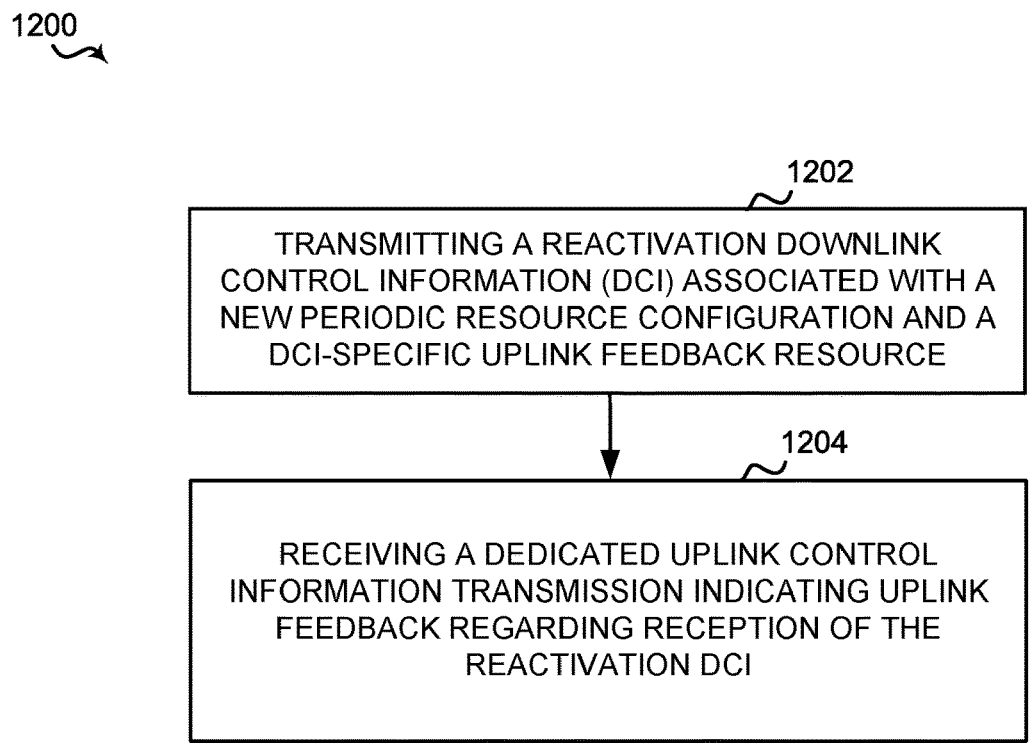
FIG. 12 is a process flow diagram of an example of a second method of receiving an indication of the successful reception of a reactivation DCI.

Referring to FIG. 12, an example of a method 1200 for receiving an indication of the successful reception and/or decoding of a reactivation DCI by the UE 110 may be performed by the BS 105 in the wireless communication network 100.

At block 1202, the method 1200 may transmit a reactivation downlink control information (DCI) associated with a new periodic resource configuration and a DCI-specific uplink feedback resource. For example, the communication component 322, the modem 320, and/or the processor 312 of the BS 105 may transmit a reactivation DCI, such as the reactivation DCI 610. The communication component 322 may send the reactivation DCI 710 to the transceiver 302 or the transmitter 308. The transceiver 302 or the transmitter 308 may convert the digital data of the reactivation DCI 610 into electrical signals, and send the electrical signals to the RF front end 388. The RF front end 388 may filter, amplify, and/or convert the electrical signals into electro-magnetic signals. The one or more antennas 365 may transmit the electro-magnetic signals.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting a reactivation downlink control information (DCI) associated with a new periodic resource configuration and a DCI-specific uplink feedback resource.

At block 1204, the method 1200 may receive a dedicated uplink control information transmission indicating uplink feedback regarding reception of the reactivation DCI. For example, the communication component 322, the modem 320, and/or the processor 312 of the BS 105 may receive ACK/NACK PUCCH data 614. The one or more antennas 365 may receive electro-magnetic signals from one or more antennas 365 of the BS 105. The RF front end 388 may filter, amplify, and/or extract electrical signals carried by the electro-magnetic signals. The transceiver 302 or the receiver 306 may digitize and convert the electrical signal into the data, such as the ACK/NACK PUCCH data 614, and send to the communication component 322.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving a dedicated uplink control information transmission indicating uplink feedback regarding reception of the reactivation DCI.

Figure 13:
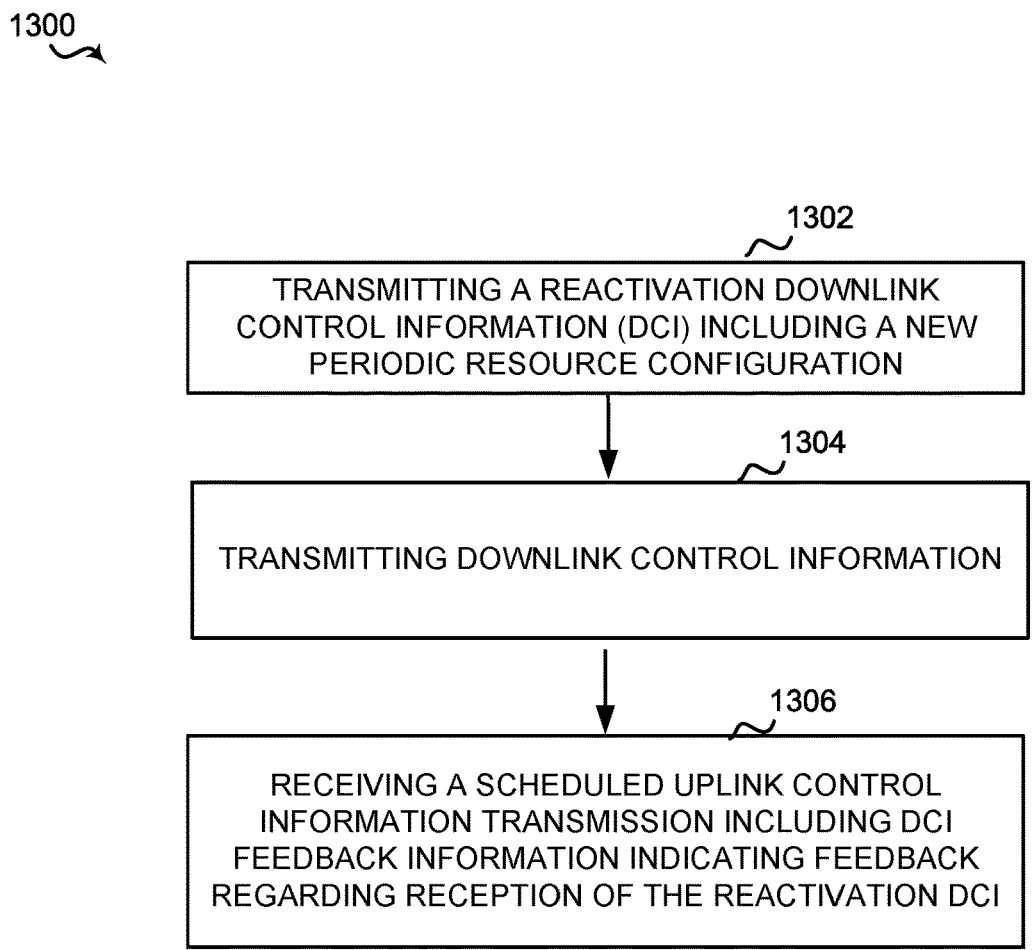
FIG. 13 is a process flow diagram of an example of a third method of receiving an indication of the successful reception of a reactivation DCI.

Referring to FIG. 13, an example of a method 1300 for receiving an indication of the successful reception and/or decoding of a reactivation DCI by the UE 110 may be performed by the BS 105 in the wireless communication network 100.

At block 1302, the method 1300 may transmit a reactivation downlink control information (DCI) including a new periodic resource configuration. For example, the communication component 322, the modem 320, and/or the processor 312 of the BS 105 may transmit a reactivation DCI, such as the reactivation DCI 710. The communication component 322 may send the reactivation DCI 710 to the transceiver 302 or the transmitter 308. The transceiver 302 or the transmitter 308 may convert the digital data of the reactivation DCI 710 into electrical signals, and send the electrical signals to the RF front end 388. The RF front end 388 may filter, amplify, and/or convert the electrical signals into electro-magnetic signals. The one or more antennas 365 may transmit the electro-magnetic signals.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting a reactivation downlink control information (DCI) including a new periodic resource configuration.

At block 1304, the method 1300 may transmit downlink control information. For example, the communication component 322, the modem 320, and/or the processor 312 of the BS 105 may transmit a downlink control information, such as the SPS PDSCH data 704. The communication component 322 may send the SPS PDSCH data 704 to the transceiver 302 or the transmitter 308. The transceiver 302 or the transmitter 308 may convert the digital data of the SPS PDSCH data 704 into electrical signals, and send the electrical signals to the RF front end 388. The RF front end 388 may filter, amplify, and/or convert the electrical signals into electro-magnetic signals. The one or more antennas 365 may transmit the electro-magnetic signals.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting downlink control information.

At block 1306, the method 1300 may receive a scheduled uplink control information transmission including the DCI feedback information indicating feedback regarding reception of the reactivation DCI. For example, the communication component 322, the modem 320, and/or the processor 312 of the BS 105 may receive the PUCCH data 754 including the appended ACK for the reactivation DCI 710 at a transmission delay specified in the reactivation DCI. The one or more antennas 365 may receive electro-magnetic signals from one or more antennas 365 of the BS 105. The RF front end 388 may filter, amplify, and/or extract electrical signals carried by the electro-magnetic signals. The transceiver 302 or the receiver 306 may digitize and convert the electrical signal into the data, such as the PUCCH data 754 including the appended ACK for the reactivation DCI 710, and send to the communication component 322.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving a scheduled uplink control information transmission including the DCI feedback information indicating feedback regarding reception of the reactivation DCI.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

Some Further Example Embodiments

An aspect of the present disclosure includes a method for receiving a reactivation downlink control information (DCI) associated with a new periodic resource configuration and an updated uplink feedback parameter for a scheduled uplink control information transmission, receiving downlink control information, changing a transmission parameter of the scheduled uplink control information transmission based on the updated uplink feedback parameter, and transmitting the scheduled uplink control information transmission based on the changed transmission parameter to indicate uplink feedback regarding reception of the reactivation DCI.

Any of the above example methods where changing the transmission parameter further comprises changing the transmission parameter further comprises changing a transmission delay from a first duration to a second duration and transmitting the scheduled uplink control information transmission further comprises transmitting after waiting the second duration after receiving the downlink control information.

Any of the above example methods includes determining a channel quality of a downlink control channel and determining the second duration of the transmission delay based on the channel quality.

Any of the above example methods where the reactivation DCI comprises a semi-persistent schedule reactivation DCI or a configuration grant reactivation DCI.

Any of the above example methods where changing the transmission parameter based on the updated uplink feedback parameter includes changing at least one of a transmission delay associated with transmitting the scheduled uplink control information transmission, a resource location of the scheduled uplink control information transmission, a resource size of the scheduled uplink control information transmission, or a resource format of the scheduled uplink control information transmission.

Any of the above example methods further includes determining a channel quality of an downlink control channel and determining the second duration of the transmission delay based on the channel quality.

Any of the above example methods where the transmission parameter includes at least one of a transmission delay associated with transmitting the uplink control information, a resource location of the uplink control information, a resource size of the uplink control information, or a resource format of the uplink control information.

An aspect of the present disclosure includes a method for receiving a reactivation downlink control information (DCI) associated with a new periodic resource configuration and a DCI-specific uplink feedback resource and transmitting, in response to reception of the reactivation DCI and using the DCI-specific uplink feedback resource, dedicated uplink control information transmission to indicate uplink feedback regarding reception of the reactivation DCI.

Any of the above example methods where the DCI-specific uplink feedback resource is different from a periodic uplink resource for the new periodic resource configuration.

Any of the above example methods where transmitting the dedicated uplink control information transmission further comprises transmitting after waiting a transmission delay after receiving the reactivation DCI, wherein the transmission delay is a same transmission delay used for transmitting periodic uplink feedback for an existing periodic resource configuration.

Any of the above example methods the reactivation DCI comprises DCI-specific configuration information associated with the dedicated uplink control information transmission and the DCI-specific configuration information comprises at least one of a transmission delay associated with the transmitting of the dedicated uplink control information transmission, a resource location of the dedicated uplink control information transmission, a resource size of the dedicated uplink control information, or a resource format of the dedicated uplink control information transmission.

Any of the above example methods further includes transmitting, in response to failing to decode the reactivation DCI, the dedicated uplink control information having one or more negative acknowledgement bits.

Any of the above example methods where the reactivation downlink control information (DCI) comprises configuration information associated with the dedicated uplink control information and the configuration information comprises at least one of a transmission delay associated with transmitting the uplink control information, a resource location of the uplink control information, a resource size of the uplink control information, or a resource format of the dedicated uplink control information.

Any of the above example methods wherein the reactivation DCI comprises a semi-persistent schedule reactivation DCI or a configuration grant reactivation DCI.

An aspect of the present disclosure includes a method for receiving a reactivation downlink control information (DCI) including a new periodic resource configuration, receiving downlink control information, appending DCI feedback information to a scheduled uplink control information transmission, and transmitting the scheduled uplink control information transmission including the DCI feedback information to indicate feedback regarding reception of the reactivation DCI.

Any of the above example methods where transmitting the scheduled uplink control information transmission comprises transmitting on a first scheduled uplink resource after reception of the downlink control information or transmitting on every scheduled uplink resource after reception of the downlink control information Any of the above example methods where the DCI feedback information is associated with a resource set identification (ID) of the scheduled uplink control information transmission.

Any of the above example methods where transmitting the scheduled uplink control information transmission including the DCI feedback information further comprises transmitting including an indication of presence of the DCI feedback information.

Any of the above example methods where the scheduled uplink control information transmission corresponding to the new periodic resource configuration uses a different uplink resource as compared to an original scheduled uplink control information transmission of an original DCI received prior to the reactivation DCI.

Any of the above example methods where the reactivation DCI comprises a semi-persistent schedule reactivation DCI or a configuration grant reactivation DCI.

Any of the above example methods further includes receiving a plurality of additional reactivation DCIs, appending a plurality of additional DCI feedback information associated with the plurality of additional reactivation DCIs to the scheduled uplink control information transmission and wherein transmitting the scheduled uplink control information transmission including the plurality of additional DCI feedback information to indicate feedback regarding receptions of the plurality of additional reactivation DCI.

Any of the above example methods where the reactivation DCI is a semi-persistent schedule reactivation DCI or a configuration grant reactivation DCI.

Any of the above example methods further includes, in response to successful receptions of a plurality of reactivation DCI, appending a plurality of ACK bits associated with the plurality of reactivation DCI to the scheduled uplink control information and transmitting the scheduled uplink control information to indicate the successful receptions of the plurality of reactivation DCI.

Any of the above example methods where the reactivation DCI includes an action time, wherein the action time indicates a time to operate the UE based on the new periodic resource configuration.

What is claimed is:

1. A method of wireless communication by a user equipment (UE), comprising:
   receiving a reactivation downlink control information (DCI) associated with a new periodic resource configuration and an updated uplink feedback parameter for a scheduled uplink control information transmission;
   receiving downlink control information;
   changing a transmission parameter of the scheduled uplink control information transmission based on the updated uplink feedback parameter; and
   transmitting the scheduled uplink control information transmission based on the changed transmission parameter to indicate uplink feedback regarding reception of the reactivation DCI.

2. The method of claim 1,
   wherein changing the transmission parameter further comprises changing a transmission delay from a first duration to a second duration; and
   wherein transmitting the scheduled uplink control information transmission further comprises transmitting after waiting the second duration after receiving the downlink control information.

3. The method of claim 2, further comprising:
   determining a channel quality of a downlink control channel; and
   determining the second duration of the transmission delay based on the channel quality.

4. The method of claim 1, wherein the reactivation DCI comprises a semi-persistent schedule reactivation DCI or a configuration grant reactivation DCI.

5. The method of claim 1, wherein changing the transmission parameter based on the updated uplink feedback parameter includes changing at least one of a transmission delay associated with transmitting the scheduled uplink control information transmission, a resource location of the scheduled uplink control information transmission, a resource size of the scheduled uplink control information transmission, or a resource format of the scheduled uplink control information transmission.

6. A user equipment (UE), comprising:
   a memory;
   a transceiver; and
   one or more processors operatively coupled with the memory and the transceiver, the one or more processors configured to:
     receive a reactivation downlink control information (DCI) associated with a new periodic resource configuration and an updated uplink feedback parameter for a scheduled uplink control information transmission;
     receive downlink control information;
     change a transmission parameter of the scheduled uplink control information transmission based on the updated uplink feedback parameter; and
     transmit the scheduled uplink control information transmission based on the changed transmission parameter to indicate uplink feedback regarding reception of the reactivation DCI.

7. The UE of claim 6,
   wherein changing the transmission parameter further comprises changing a transmission delay from a first duration to a second duration; and
   wherein transmitting the scheduled uplink control information transmission further comprises transmitting after waiting the second duration after receiving the downlink control information.

8. The UE of claim 7, wherein the one or more processors are further configured to:
   determine a channel quality of a downlink control channel; and
   determine the second duration of the transmission delay based on the channel quality.

9. The UE of claim 6, wherein the reactivation DCI comprises a semi-persistent schedule reactivation DCI or a configuration grant reactivation DCI.

10. The UE of claim 6, wherein changing the transmission parameter based on the updated uplink feedback parameter includes changing at least one of a transmission delay associated with transmitting the scheduled uplink control information transmission, a resource location of the scheduled uplink control information transmission, a resource size of the scheduled uplink control information transmission, or a resource format of the scheduled uplink control information transmission.

11. A method of wireless communication by a user equipment (UE), comprising:
    receiving a reactivation downlink control information (DCI) associated with a new periodic resource configuration and a DCI-specific uplink feedback resource; and
    transmitting, in response to reception of the reactivation DCI and using the DCI-specific uplink feedback resource, dedicated uplink control information transmission to indicate uplink feedback regarding reception of the reactivation DCI.

12. The method of claim 11, wherein the DCI-specific uplink feedback resource is different from a periodic uplink feedback resource for the new periodic resource configuration.

13. The method of claim 11, wherein transmitting the dedicated uplink control information transmission further comprises transmitting after waiting a transmission delay after receiving the reactivation DCI, wherein the transmission delay is a same transmission delay used for transmitting periodic uplink feedback for an existing periodic resource configuration.

14. The method of claim 11,
    wherein the reactivation DCI comprises DCI-specific configuration information associated with the dedicated uplink control information transmission; and
    wherein the DCI-specific configuration information comprises at least one of a transmission delay associated with the transmitting of the dedicated uplink control information transmission, a resource location of the dedicated uplink control information transmission, a resource size of the dedicated uplink control information transmission, or a resource format of the dedicated uplink control information transmission.

15. The method of claim 11,
wherein the reactivation DCI comprises DCI-specific configuration information associated with the dedicated uplink control information transmission; and
wherein the DCI-specific configuration information comprises a first transmission delay used only for the dedicated uplink control information transmission.

16. The method of claim 11,
wherein the reactivation DCI comprises DCI-specific configuration information associated with the dedicated uplink control information transmission; and
wherein the DCI-specific configuration information comprises a first transmission delay for a periodic uplink feedback transmission and a second transmission delay for the dedicated uplink control information transmission.

17. The method of claim 11, wherein the dedicated uplink control information transmission includes a physical uplink control channel transmission or a physical uplink shared channel transmission.

18. The method of claim 11, wherein the reactivation DCI comprises a semi-persistent schedule reactivation DCI or a configuration grant reactivation DCI.

19. A user equipment (UE), comprising:
a memory;
a transceiver; and
one or more processors operatively coupled with the memory and the transceiver, the one or more processors configured to:
 receive a reactivation downlink control information (DCI) associated with a new periodic resource configuration and a DCI-specific uplink feedback resource; and
 transmit, in response to reception of the reactivation DCI and using the DCI-specific uplink feedback resource, dedicated uplink control information transmission to indicate uplink feedback regarding reception of the reactivation DCI.

20. The UE of claim 19, wherein the DCI-specific uplink feedback resource is different from a periodic uplink feedback resource for the new periodic resource configuration.

21. The UE of claim 19, wherein transmitting the dedicated uplink control information transmission further comprises transmitting after waiting a transmission delay after receiving the reactivation DCI, wherein the transmission delay is a same transmission delay used for transmitting periodic uplink feedback for an existing periodic resource configuration.

22. The UE of claim 19,
wherein the reactivation DCI comprises DCI-specific configuration information associated with the dedicated uplink control information transmission; and
wherein the DCI-specific configuration information comprises at least one of a transmission delay associated with the transmitting of the dedicated uplink control information transmission, a resource location of the dedicated uplink control information transmission, a resource size of the dedicated uplink control information transmission, or a resource format of the dedicated uplink control information transmission.

23. The UE of claim 19,
wherein the reactivation DCI comprises DCI-specific configuration information associated with the dedicated uplink control information transmission; and
wherein the DCI-specific configuration information comprises a first transmission delay used only for the dedicated uplink control information transmission.

24. The UE of claim 19,
wherein the reactivation DCI comprises DCI-specific configuration information associated with the dedicated uplink control information transmission; and
wherein the DCI-specific configuration information comprises a first transmission delay for a periodic uplink feedback transmission and a second transmission delay for the dedicated uplink control information transmission.

25. The UE of claim 19, wherein the dedicated uplink control information transmission includes a physical uplink control channel transmission or a physical uplink shared channel transmission.

26. The UE of claim 19, wherein the reactivation DCI comprises a semi-persistent schedule reactivation DCI or a configuration grant reactivation DCI.

27. A method of wireless communication by a user equipment (UE), comprising:
receiving a reactivation downlink control information (DCI) including a new periodic resource configuration;
receiving downlink control information;
including DCI feedback information in a scheduled uplink control information transmission; and
transmitting the scheduled uplink control information transmission including the DCI feedback information to indicate feedback regarding reception of the reactivation DCI.

28. The method of claim 27, wherein transmitting the scheduled uplink control information transmission comprises transmitting on a first scheduled uplink feedback resource after reception of the downlink control information or transmitting on every scheduled uplink feedback resource after reception of the downlink control information.

29. The method of claim 27, wherein the DCI feedback information is associated with a resource set identification (ID) of the scheduled uplink control information transmission.

30. The method of claim 27, wherein the DCI feedback information includes one or more data bits or a physical identifier associated with an uplink feedback resource.

31. The method of claim 30, wherein the uplink feedback resource is a physical uplink control channel resource and the physical identifier includes a cyclic shift.

32. The method of claim 27, wherein the scheduled uplink control information transmission corresponding to the new periodic resource configuration uses a different uplink resource as compared to an original scheduled uplink control information transmission of an original DCI received prior to the reactivation DCI.

33. The method of claim 27, wherein the reactivation DCI comprises a semi-persistent schedule reactivation DCI or a configuration grant reactivation DCI.

34. The method of claim 27, further comprising:
receiving a plurality of additional reactivation DCIs;
appending a plurality of additional DCI feedback information associated with the plurality of additional reactivation DCIs to the scheduled uplink control information transmission; and
wherein transmitting the scheduled uplink control information transmission including the plurality of additional DCI feedback information to indicate feedback regarding receptions of the plurality of additional reactivation DCI.

35. The method of claim 27, wherein the reactivation DCI includes an action time, wherein the action time indicates a time to operate the UE based on the new periodic resource configuration.

36. A user equipment (UE), comprising:
a memory;
a transceiver; and
one or more processors operatively coupled with the memory and the transceiver, the one or more processors configured to:
receive a reactivation downlink control information (DCI) including a new periodic resource configuration;
receive downlink control information;
include DCI feedback information in a scheduled uplink control information transmission; and
transmit the scheduled uplink control information transmission including the DCI feedback information to indicate feedback regarding reception of the reactivation DCI.

37. The UE of claim 36, wherein transmitting the scheduled uplink control information transmission comprises transmitting on a first scheduled uplink feedback resource after reception of the downlink control information or transmitting on every scheduled uplink feedback resource after reception of the downlink control information.

38. The UE of claim 36, wherein the DCI feedback information is associated with a resource set identification (ID) of the scheduled uplink control information transmission.

39. The UE of claim 36, wherein the DCI feedback information includes one or more data bits or a physical identifier associated with an uplink feedback resource.

40. The UE of claim 39, wherein the uplink feedback resource is a physical uplink control channel resource and the physical identifier includes a cyclic shift.

41. The UE of claim 36, wherein the scheduled uplink control information transmission corresponding to the new periodic resource configuration uses a different uplink resource as compared to an original scheduled uplink control information transmission of an original DCI received prior to the reactivation DCI.

42. The UE of claim 36, wherein the reactivation DCI comprises a semi-persistent schedule reactivation DCI or a configuration grant reactivation DCI.

43. The UE of claim 36, wherein the one or more processors are further configured to:
receive a plurality of additional reactivation DCIs;
append a plurality of additional DCI feedback information associated with the plurality of additional reactivation DCIs to the scheduled uplink control information transmission; and
wherein transmitting the scheduled uplink control information transmission including the plurality of additional DCI feedback information to indicate feedback regarding receptions of the plurality of additional reactivation DCI.

44. The UE of claim 36, wherein the reactivation DCI includes an action time, wherein the action time indicates a time to operate the UE based on the new periodic resource configuration.

45. A method of wireless communication by a base station (BS), comprising:
transmitting a reactivation downlink control information (DCI) associated with a new periodic resource configuration and an updated uplink feedback parameter for a scheduled uplink control information transmission;
transmitting downlink control information; and
receiving the scheduled uplink control information transmission based on the updated uplink feedback parameter indicating uplink feedback regarding reception of the reactivation DCI.

46. A method of wireless communication by a base station (BS), comprising:
transmitting a reactivation downlink control information (DCI) associated with a new periodic resource configuration and a DCI-specific uplink feedback resource; and
receiving a dedicated uplink control information transmission indicating uplink feedback regarding reception of the reactivation DCI.

47. A method of wireless communication by a base station (BS), comprising:
transmitting a reactivation downlink control information (DCI) including a new periodic resource configuration;
transmitting downlink control information; and
receiving a scheduled uplink control information transmission including DCI feedback information indicating feedback regarding reception of the reactivation DCI.

* * * * *